United States Patent [19]

Masaie et al.

[11] Patent Number: 5,403,377
[45] Date of Patent: Apr. 4, 1995

[54] FLUX-CORED WIRE

[75] Inventors: Norio Masaie; Kazuhiko Ito; Akira Matsuguchi, all of Fujisawa, Japan

[73] Assignee: Kabushiki Kaisha Kobe Seiko Sho, Kobe, Japan

[21] Appl. No.: 128,644

[22] Filed: Sep. 30, 1993

[30] Foreign Application Priority Data

Sep. 30, 1992 [JP] Japan .................. 4-285034
Sep. 22, 1993 [JP] Japan .................. 5-259085

[51] Int. Cl.⁶ .............................................. B23K 35/34
[52] U.S. Cl. ........................................ 75/304; 148/26; 219/146.22; 219/146.24
[58] Field of Search ...................... 148/26; 75/304; 219/146.22, 146.24

[56] References Cited

U.S. PATENT DOCUMENTS

| | | | |
|---|---|---|---|
| 3,959,031 | 5/1976 | More ...................... | 148/26 |
| 4,723,061 | 2/1988 | Munz et al. ............. | 219/146.24 |
| 4,832,742 | 5/1989 | Ototam .................... | 75/304 |
| 5,120,931 | 6/1992 | Kotecki et al. ......... | 219/146.22 |
| 5,205,856 | 4/1993 | Prinz ....................... | 75/304 |

FOREIGN PATENT DOCUMENTS 0431904 6/1991 European Pat. Off. .
1056804 2/1967 United Kingdom .

OTHER PUBLICATIONS

Patent Abstracts of Japan, vol. 14, No. 552 (M-1056), Dec. 7, 1990, JP-A-2235596, Sep. 18, 1990.

*Primary Examiner*—Peter D. Rosenberg
*Attorney, Agent, or Firm*—Oblon, Spivak, McClelland, Maier, & Neustadt

[57] ABSTRACT

Disclosed is a flux cored wire for low alloy steels and high alloy steels which is excellent in arc stability and moisture absorption resistance of fume/slag. In this flux-cored wire, the flux components and the flux ratio are specified within the following ranges: namely, Na compound ($Na_2O$ equivalent amount)+K compound ($K_2O$ equivalent amount) (flux wt %): 1.5–6.0%; soluble Na compound ($Na_2O$ equivalent amount) (flux wt %): 1.5% or less; soluble K compound ($K_2O$ equivalent amount) (flux wt %): 0.8% or less; $SiO_2$ (flux wt %): 5–30%; $TiO_2+ZrO_2+Al_2O_3$ (flux wt %): 5–40%; flux ratio (wire wt %): 10–30%. Further, the flux components satisfy the formula of {soluble Na compound ($Na_2O$ equivalent amount)+0.1×soluble K compound ($K_2O$ equivalent amount)}/{$SiO_2$+0.5×($TiO_2+ZrO_2+Al_2O_3$)}: $40\times10^{-3}$ or less. In addition, one or more kinds of a Li compound ($Li_2O$ equivalent amount) and a Cs compound ($Cs_2O$ equivalent amount) may be added in the total amount of 0.1–3.0 wt % so as to satisfy the formula of {soluble Na compound ($Na_2O$ equivalent amount)+0.1×soluble K compound ($K_2O$ equivalent amount)-Li compound ($Li_2O$ equivalent amount)-Cs compound ($Cs_2O$ equivalent amount)}/{$SiO_2$+0.5×($TiO_2+ZrO_2+Al_2O_3$)}=$20\times10^{-3}$ or less.

3 Claims, 1 Drawing Sheet

FLUX-CORED WIRE

BACKGROUND OF THE INVENTION

1. Field of the Invention

The present invention relates to a flux-cored wire, and particularly to a flux-cored wire for low alloy steels and high alloy steels which is excellent in arc stability and in moisture absorption resistance of fume and slag.

2. Description of the Related Art

In the conventional flux-cored wire, as shown in Conventional Examples in the preferred embodiments described later, a flux containing various components is filled in a metal sheath, and an Na compound is mixed in the flux in an amount of about 1.5 to 6 wt % ($Na_2O$ equivalent amount) for improving arc stability.

In bead-on-plate welding, horizontal fillet welding, or multi-layer welding using a flux-cored wire, there is a fear that fume generated during welding adheres on the bead surface and the base material surface in the vicinity thereof, or slag remains at the bead toe portion and the bead surface. As for the residue of slag, since a flux-cored wire for low alloy steels or high alloy steels contains a large amount of alloy components in flux, it is inferior in the slag releasability to a flux-cored wire for mild steels, so that the slag tends to remain on the bead without being released. The reason for this is that oxides of alloy components in flux (in particular, oxides of Nb, Cr, and Ti) are concentrated between the slag and the welding metal surface, which functions as a binder. Accordingly, the flux-cored wire has such an essential property that the slag is liable to remain on the bead surface.

The fume generated on the bead surface or the base material surface in the vicinity thereof during welding operation, and the slag remaining on the bead surface tend to absorb moisture. Consequently, when multi-layer welding is performed on the bead and in the vicinity thereof in such a state, there arises such a problem that pits and blow-holes are generated on the next pass bead. In particular, in the welding operation under a high temperature and high moisture condition, the above problem significantly appears.

SUMMARY OF THE INVENTION

Accordingly, an object of the present invention is to solve the above problem of the prior art, and to provide a flux-cored wire for low alloy steels or high alloy steels which is excellent in arc stability and in moisture absorption resistance of fume/slag.

To solve the above problem, the present inventors have made various experimental researches, and accomplished the present invention.

Namely, in a first aspect of the present invention, there is provided a flux cored wire for low alloy steels and high alloy steels comprising:

a metal made sheath; and a flux filled in the metal made sheath;

wherein the content of an Na compound ($Na_2O$ equivalent amount)+a K compound ($K_2O$ equivalent amount), the contents of a soluble Na compound, a soluble K compound, $SiO_2$, $TiO_2$, $ZrO_2$ and $Al_2O_3$ in the filled flux, and a flux ratio are specified within the following ranges, respectively;

Na compound ($Na_2O$ equivalent amount)+K compound ($K_2O$ equivalent amount) (flux wt %): 1.5–6.0%, soluble Na compound ($Na_2O$ equivalent amount) (flux. wt %): 1.5% or less, soluble K compound ($K_2O$ equivalent amount) (flux wt %): 0.8% or less, $SiO_2$ (flux wt %): 5–30%

$TiO_2+ZrO_2+Al_2O_3$ (flux wt %): 5–40% flux ratio (wire wt %): 10–30%, and wherein the contents of the soluble Na compound, the soluble K compound, $SiO_2$, $TiO_2$, $ZrO_2$ and $Al_2O_3$ satisfy the following formula (1);

$$\{\text{soluble Na compound (Na}_2\text{O equivalent amount)} + 0.1 \times \text{soluble K compound (K}_2\text{O equivalent amount)}\}/\{SiO_2 + 0.5 \times (TiO_2 + ZrO_2 + Al_2O_3)\} : 40 \times 10^{-3} \text{ or less} \quad (1)$$

Further, in a second aspect of the present invention, there is provided a flux cored wire for low alloy steels and high alloy steels comprising:

a metal made sheath; and a flux filled in the metal made sheath;

wherein the content of an Na compound ($Na_2O$ equivalent amount)+a K compound ($K_2O$ equivalent amount), the contents of a soluble Na compound, a soluble K compound, a Li compound, a Cs compound, $SiO_2$, $TiO_2$, $ZrO_2$ and $Al_2O_3$ in the filled flux, and a flux ratio are specified within the following ranges, respectively;

Na compound ($Na_2O$ equivalent amount)+K compound ($K_2O$ equivalent amount) (flux wt %): 1.5–6.0%, soluble Na compound ($Na_2O$ equivalent amount) (flux wt %): 1.5% or less, soluble K compound ($K_2O$ equivalent amount) (flux wt %): 0.8% or less, the total (flux wt %) of one or more kinds of Li compound ($Li_2O$ equivalent amount) and Cs compound ($Cs_2O$ equivalent amount): 0.1–3.0%

$SiO_2$ (flux wt %): 5–30%

$TiO_2+ZrO_2+Al_2O_3$ (flux wt %): 5–40% flux ratio (wire wt %): 10–30%, and wherein the contents of the soluble Na compound, the soluble K compound, the Li compound, the Cs compound, $SiO_2$, $TiO_2$, $ZrO_2$ and $Al_2O_3$ satisfy the following formula (2);

$$\{\text{soluble Na compound (Na}_2\text{O equivalent amount)} + 0.1 \times \text{soluble K compound (K}_2\text{O equivalent amount)} - \text{Li compound (Li}_2\text{O equivalent amount)} - \text{Cs compound (Cs}_2\text{O equivalent amount)}\}/ \{SiO_2 + 0.5 \times (TiO_2 + ZrO_2 + Al_2O_3)\} : 20 \times 10^{-3} \text{ or less} \quad (2)$$

DETAILED DESCRIPTION OF THE PREFERRED EMBODIMENTS

Figure 1:
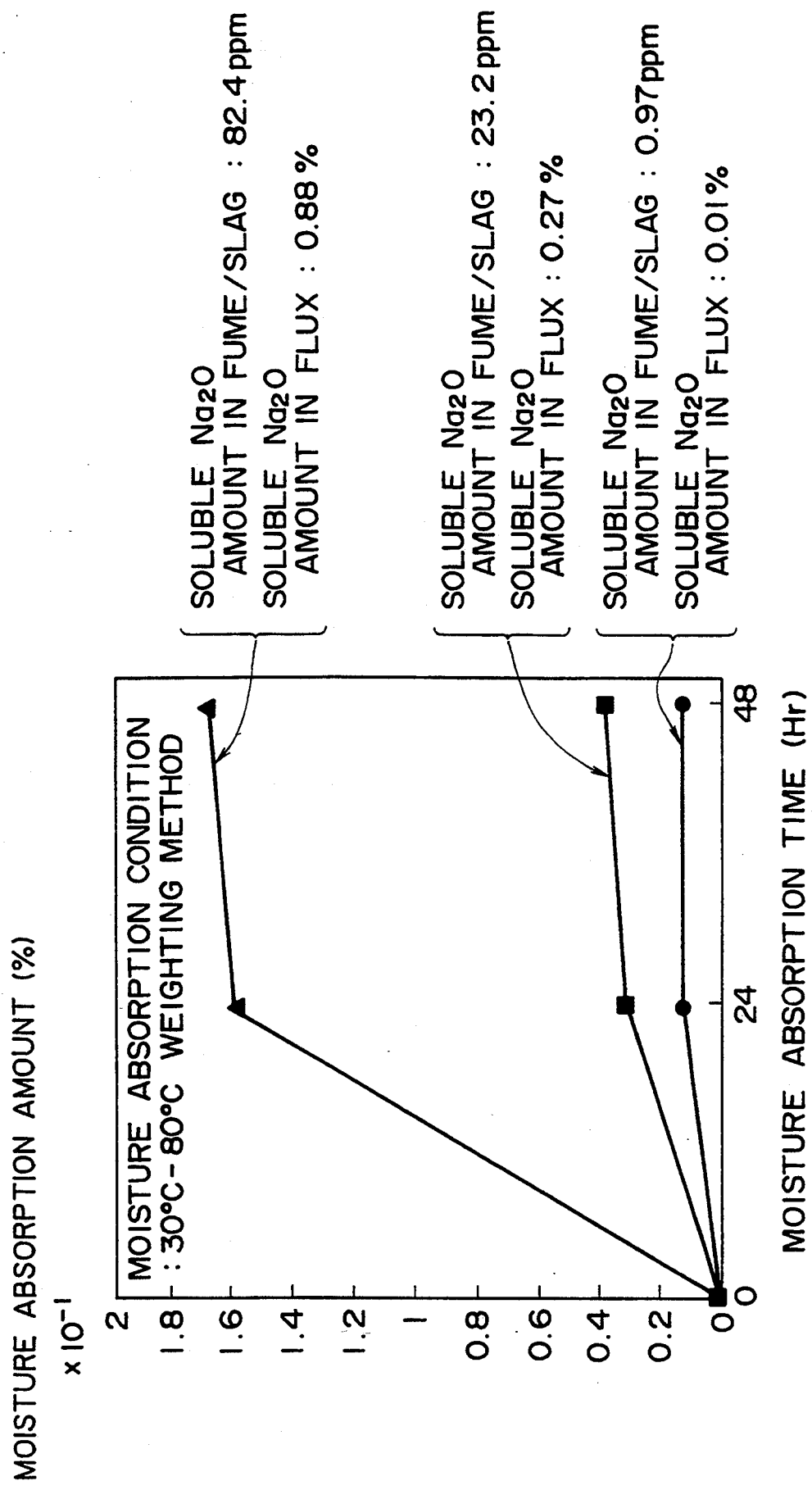
FIG. 1 is a view showing the result of moisture absorption test for fume/slag.

Hereinafter, the present invention will be described in detail. First, the results of the basic experiments from which the basic concept of the present invention has been found will be described.

(1) Moisture absorption in fume/slag:

FIG. 1 shows the results of the moisture absorption test for fume/slag. The moisture absorption amount in fume/slag is affected by a ratio between the amounts of a soluble Na compound and a soluble K compound in the fume/slag and the amount of a slag forming agent. Further, when the composition of the slag forming agent is constant, the amount of the soluble Na compound ($Na_2O$ equivalent amount) in fume/slag is affected by the amount of the soluble Na compound amount ($Na_2O$ equivalent amount) in flux.

For this reason, the Na amount in soluble compounds in fume/slag was determined in the following manner:

① The fume/slag remaining on a welding bead was pulverized, and sieved in the size of 0.5–5 mm.

② A sample of ① in an amount of 50 g was added with pure water in such a manner that the mixed solution was in an amount of 500 ml (volume ratio by weight: 10%).

③ The mixture solution of ② was continuously shaken for 6 hrs (shaking width: 4–5 cm, 200 times/min).

④ The mixture solution of ③ was filtered through a glass fiber filter (aperture diameter: 1 μm), and the resultant solution was determined for Na. The amount of the determined Na was converted in an $Na_2O$ amount, which was taken as the amount of the soluble Na compound. An atomic absorption method was used as the analysis method.

In addition, a soluble Na compound in flux will be described later.

(2) Measure of improving moisture absorption resistance of fume/slag:

The lowering of the amount of soluble alkali metal compounds in the filled flux is effective to improve the moisture absorption resistance of fume/slag. It was revealed that a soluble Na compound has a larger effect than the other alkali metal compounds. However, when the total amount of alkali metal compounds (particularly, an Na compound) in flux is excessively lowered, there arises a problem in deteriorating arc stability. Accordingly, in terms of ensuring the arc stability, it is important to reduce the amount of the soluble alkali metal compounds of the total alkali metal compounds in the filled flux, and to add the total alkali metal compounds in the amount enough to ensure the arc stability. This makes it possible to improve the moisture absorption resistance and to ensure the arc stability.

On the other hand, of flux-cored wires with flux containing soluble alkali metal compounds in a large amount, there was found a type being excellent in moisture absorption resistance. The reason for this is due to the influence of the amount of $SiO_2$ in slag when the flux is converted in slag. Namely, $SiO_2$ incorporates alkali metals in slag which is derived from soluble alkali metal compounds (hereinafter, referred to as soluble alkali metal) in the glass state, thereby preventing the soluble alkali metals from eluting from the slag. However, it was found that $SiO_2$ has a restriction of incorporating the soluble alkali metals, and there is a suitable relationship between the amount of the soluble alkali metals and the amount of $SiO_2$. The component of forming skeleton of glass (polymer) (hereinafter, referred to as NWF component) comprises $TiO_2$, $ZrO_2$, and $Al_2O_3$, other than $SiO_2$, which are different in the incorporating effect from each other. $SiO_2$ has the largest effect. Further, the amount of $SiO_2$ in slag is considered to be proportional to the amount of $SiO_2$ in flux.

In terms of the atomic radius of an alkali metal, it is considered that, by addition of Li being smaller in the atomic radius than Na and K, the glass structure is more strongly reinforced, thus improving the moisture absorption resistance.

Thus, it was found that the moisture absorption resistance of fume/slag is improved by mixing Li in the flux as an Li compound, even when the flux contains the soluble alkali metal compounds (Na, K).

Further, as for Cs being an alkali metal, it has a larger atomic radius than that of Na or K, and exhibits the same effect as in Li. The detail reason for this is not apparent. As for an alkali metal Rb, it exhibits the same effect in Cs; however, in terms of general-use characteristic, the element is considered to be undesirable.

On the basis of the above knowledge, the present inventors have variously investigated, and found that a wire with a flux of satisfying the following formula (1) or (2) exhibits the excellent arc stability and the moisture absorption resistance of the fume/slag.

$$\text{(soluble Na compound ($Na_2O$ equivalent amount)} + 0.1 \times \text{soluble K compound ($K_2O$ equivalent amount)}/\{SiO_2 + 0.5 \times (TiO_2 + ZrO_2 + Al_2O_3)\} : 40 \times 10^{-3} \text{ or less} \quad (1)$$

$$\text{(soluble Na compound ($Na_2O$ equivalent amount)} + 0.1 \times \text{soluble K compound ($K_2O$ equivalent amount)} - \text{Li compound ($Li_2O$ equivalent amount)} - \text{Cs compound ($Cs_2O$ equivalent amount)}\}/ \{SiO_2 + 0.5 \times (TiO_2 + ZrO_2 + Al_2O_3)\} : 20 \times 10^{-3} \text{ or less} \quad (2)$$

Next, there will be described the reason for limiting the components of the filled flux and the flux ratio in the flux-cored wire of the present invention having the above basic concept. In addition, the ratio (%) of each component is expressed by wt % on the basis of the whole flux.

Na compound ($Na_2O$ equivalent amount)+K compound ($K_2O$ equivalent amount): 1.5–6.0%

When being less than 1.5%, the arc stability is worse. On the contrary, when exceeding 6.0%, the high temperature vapor pressure is increased and the amounts of spatter and fume are increased.

Soluble Na compound:

When the soluble Na compound ($Na_2O$ equivalent amount) in flux exceeds 1.5%, the soluble Na in fume and slag is increased, so that the fume and slag tend to absorb moisture, thus generating pits and blow-holes. For reducing the soluble Na, the Na source in flux may be decreased.

Accordingly, the amount of the soluble Na compound ($Na_2O$ equivalent amount) is specified in the range of 1.5% or less. In consideration of the moisture absorption resistance, preferably, it is specified in the range of 0.7% or less. As the soluble Na compound, NaF, sodium silicate anhydrite and sodium carbonate may be used.

Soluble K compound:

When the amount of the soluble K compound ($K_2O$ equivalent amount) in flux exceeds 0.8%, fume and slag tend to absorb moisture on the same reason as in the soluble Na compound, thus generating pits and blowholes.

Accordingly, the amount of the soluble Na compound ($Na_2O$ equivalent amount) is specified in the range of 0.8% or less. In consideration of the moisture absorption resistance and arc stability, preferably, it is specified in the range of 0.6% or less. As the soluble K compound, potassium titanate and the like may be used.

SiO₂:

When $SiO_2$ in flux exceeds 30%, there arises a problem that the slag inclusion is generated and the workability is lowered. On the contrary, when $SiO_2$ is less than 5%, the slag amount is reduced, which brings about problems that the covering of the slag is deteriorated to make poor the surface appearance of the deposition, and vertical welding is made difficult. Accordingly, the content of $SiO_2$ is specified in the range of from 5 to 30%, preferably, in the range of from 15 to 20%.

$TiO_2+ZrO_2+Al_2O_3$:

$TiO_2$, $ZrO_2$ and $Al_2O_3$ are each NWF components (of forming skeleton of glass) similarly to $SiO_2$, and the total amount of one or more kinds of $TiO_2$, $ZrO_2$ and $Al_2O_3$ is specified in the range of from 5 to 40% on the same reason as in $SiO_2$. Namely, when the total amount of these components exceeds 40%, there arises a problem that the slag inclusion is generated and the workability is lowered. On the contrary, when the total amount is less than 5%, the slag amount is reduced, which brings about problems that the covering of the slag is deteriorated to make poor the surface appearance of the deposition, and vertical welding is made difficult. In addition, the total amount of these compounds is, preferably, in the range of from 20 to 30%.

Relational formula between amount of soluble alkali metals (Na, k) and amount of NWF components:

The NWF components such as $SiO_2$, $TiO_2$, $ZrO_2$ and $Al_2O_3$ have an effect of incorporating the soluble alkali metals in slag. For achieving the effect, the suitable relationship is required between the amount of the soluble alkali metals and the amount of the NWF components. Namely, the value of the relationship of {soluble Na compound ($Na_2O$ equivalent amount)+0.1×soluble K compound ($K_2O$ equivalent amount)/{$SiO_2+0.5\times(TiO_2+ZrO_2+Al_2O_3)$} must be within the specified range.

When the value of the above formula exceeds $40\times10^{-3}$, the moisture absorption resistance of fume/slag is worse, thus generating pits and blow-holes. Accordingly, when the value of the above formula is $40\times10^{-3}$ or less, the moisture absorption resistance is excellent. The value of the above formula is, preferably, in the range of $25\times10^{-3}$ or less.

Li compound, Cs compound:

By addition of one or more kinds of Li compound ($Li_2O$ equivalent amount) and Cs compound ($Cs_2O$ equivalent amount) in a suitable amount, it is assumed that the glass structure is reinforced without harming the arc stability effect and the moisture absorption resistance is improved. Accordingly, these compounds may be added, as needed. When the added amount exceeds 3%, there arises a problem in increasing spatters in welding. As a result of observation for the arc phenomenon using a high speed video, it was revealed that the suspended droplet was strongly moved (fluttered) into spatter. On the contrary, when being less than 0.1%, the moisture absorption resistance of fume/slag is worse, thus generating pits and blow-holes. Thus, the added amount of one or more kinds of Li compound ($Li_2O$ equivalent amount) and Cs compound ($Cs_2O$ equivalent amount) is specified in the range of from 0.1 to 3%, preferably, in the range of 0.5 to 2%.

In addition, when both the Li compound and Cs compound are added, each added amount of the Li compound and Cs compound is suitably specified in the range of from 0.01 to 2.0% on the basis of the $Li_2O$ equivalent amount or Cs equivalent amount, preferably, in the range of from 0.05 to 1.0%.

Relational formula between amount of alkali metals (Li, Cs) and amount of NWF components:

When one or more kinds of the Li compound and Cs compound are added, the relational formula in consideration of $Li_2O$ equivalent amount and $Cs_2O$ equivalent amount must be within the specified range. Namely, (soluble Na compound ($Na_2O$ equivalent amount)+0.1×soluble K compound ($K_2O$ equivalent amount)-Li compound ($Li_2O$ equivalent amount)-Cs compound ($Cs_2O$ equivalent amount)}/{$SiO_2+0.5\times(TiO_2+ZrO_2+Al_2O_3)$}=$20\times10^{-3}$ or less.

When the value of the above formula exceeds $20\times10^{-3}$, the moisture absorption resistance is worse, thereby generating pits and blow-holes. Accordingly, when the value of the above formula is in the rage of $20\times10^{-3}$ or less, the arc stability and the moisture absorption resistance are excellent. The value of the above formula is, preferably, in the range of $10\times10^{-3}$ or less.

Flux ratio (wire wt %):

When the flux ratio exceeds 30%, the drawing becomes difficult in manufacture of the flux-cored wire. On the contrary, when the flux ratio is less than 10%, the amounts of the slag forming agent and the arc stabilizer are decreased, thus deteriorating the covering of the slag and the arc stability. Accordingly, the flux ratio is specified in the range of from 10 to 30%, preferably, in the range of from 17 to 25%.

In addition, the other components such as alloy components and deoxidizing agent may be suitably contained in flux. Further, the material of the metal sheath and the dimension and the shape of the flux-cored wire may be suitably determined.

The present invention will become more apparent by way of the following examples.

EXAMPLE

Flux-cored wires were manufactured in the following procedure, and subjected to welding tests.

As metal made sheaths, a SUS304 made hoop (size: thickness of 0.4 mm, width of 9 mm) was used for an austenitic wire; and a SUS 410 made hoop (size; thickness of 4 mm, width of 9 mm) was used for a martensitic wire. In addition, the wire diameter was 1.2 mmφ.

The flux components were prepared in respective amounts as shown in Tables 1, 2 and 3, on the criterion of the following component values, and which were filled in the metal made sheath with a flux ratio of about 22%.

metal components: 55%
NFW components: 35%
fluoride component: 1%
others: 9%

Here, the metal components include Cr, Ni, Fe, Mo and the like; and NFW components include $SiO_2$, $TiO_2$, $ZrO_2$, $Al_2O_3$ and the like. In addition, the preparation of the soluble Na compound and the soluble K compound was performed by suitably mixing of the various raw materials.

strongly soluble Na compound: NaF, sodium silicate anhydrite, sodium carbonate
strongly soluble K compound: potassium titanate
weakly soluble Na compound: albite, mica
weakly soluble K compound: potassium feldspar potassium, silicofluoride
insoluble Na compound: sodium titanate glass
insoluble K compound: potassium titanate glass The welding condition was as follows:
wire diameter: 1.2 mm$\phi$
voltage: 30 V
current: 200 A
shield gas: $CO_2$ (25 ml/min)
welding speed: 30 cm/min
welding position: bead-on-plate
polarity: DC-RP
wire extension: 20–25 mm
base material: SUS304 (thickness: 30 mm)

The sampling of slag/fume was made in such a manner that welding was made for a length of about 400 mm under the above welding condition and the residue (mainly slag/fume) on the base material was sampled by a wire brush.

The soluble Na compound, soluble K compound, Li compound and Cs compound in flux was determined in the following manner:

① The wire was cut in the length of 5–10 mm.
② The cut portions were pulverized for 3min by a vibrating mill.
③ The pulverized powder was filtered through a screen of 28 mesh (hoop: removed)
④ The filtered powder of 2g was prepared, and was left in pure water at 60° C. (volume of pure water:-weight of slag and fume=10:1) for 1hr.
⑤ After precipitating the powder, a solution passing through a 1$\mu$ filter was measured for $Na^+$, $K^+$, $Li^+$, and $Cs^+$ by atomic absorption, followed by conversion into $Na_2O$, $K_2O$, $Li_2O$ and $Cs_2O$ (in order to examine the eluted amount (%) from flux).

The NFW components were determined in such a manner that the sample of ③ was chemically analyzed, and the values of Si, Ti, Zr and Al were obtained and converted into $SiO_2$, $TiO_2$, $ZrO_2$, $Al_2O_3$, the total of which were taken as the amount of NFW components (wt % on the basis of the whole flux).

The arc stability and the moisture absorption resistance were evaluated in the following procedure. The results are shown in each table.

Evaluation for arc stability:
This was made by the welder's sensory test on the basis of the following criterion:
good →○
slightly poor (arc length; not stabilized slightly)→△
arc, current and voltage: not stabilized→×

Evaluation for moisture absorption resistance of fume/slag:
① Fume and slag on the bead were sampled, and pulverized by a mill in a size of 28 mesh or less.
② The resulting powder was left in 30° C.-80% R.H for 48 hrs, and measured for the increased amount (weighting method) on the following criterion:
0.1% or more→×
0.05–0.1%→△
0.01–0.05%→○
0.01 or less→⊙

In Table 1, Conventional Example No. 1 is excellent in arc stability; but is insufficient in moisture absorption resistance of fume/slag. Comparative Example No. 2, in which the slag in Conventional Example No. 1 is shifted to the $SiO_2$ system, is excellent in arc stability; but is insufficient in moisture absorption resistance of fume/slag. Comparative Example No. 3, in which the slag in Conventional Example No. 1 is further shifted to the $SiO_2$ system, is excellent in arc stability; but is insufficient in moisture absorption resistance of fume/slag.

Inventive Example No.4, in which the soluble Na amount in Comparative Example No. 3 is reduced in half, is excellent in arc stability (satisfy the total amount of $Na_2O+K_2O$); and is sufficient in moisture absorption resistance (satisfy the soluble $Na_2O$ amount). Inventive Example No. 5, in which the soluble Na amount in Comparative Example No. 4 is further reduced in half, is excellent in arc stability (satisfy the total amount of $Na_2O+K_2O$); and is sufficient in moisture absorption resistance (satisfy the soluble $Na_2O$ amount).

Comparative Example No. 6, in which the soluble Na amount in Inventive Example No. 5 is further reduced in half, is insufficient in arc stability (not satisfy the total amount of $Na_2O+K_2O$); and is sufficient in moisture absorption resistance (satisfy the soluble $Na_2O$ amount).

Inventive Example No. 7, in which the soluble Na amount in Comparative Example No. 6 is not changed and the total $Na_2O$ amount is increased, is excellent in arc stability (satisfy the total amount of $Na_2O+K_2O$); and is excellent in moisture absorption resistance (satisfy the soluble $Na_2O$ amount). Inventive Example No. 8, in which the total $K_2O$ amount in Inventive Example No. 5 is increased, is excellent in arc stability (satisfy the total amount of $Na_2O+K_2O$); and is sufficient in moisture absorption resistance (satisfy the soluble $Na_2O$ amount). Inventive Example No. 9 is the same as Inventive Example No. 8.

Comparative Example No. 10, in which the soluble $K_2O$ amount in Inventive Example No. 7 is set at 0.9 wt %, is excellent in arc stability (satisfy the total amount of $Na_2O+K_2O$); and is insufficient in moisture absorption resistance (the soluble $Na_2O$ amount exceeds the allowable range).

Inventive Example No. 11, in which the soluble $K_2O$ amount in Inventive Example No. 5 is set at 0.10 wt %, is excellent in arc stability (satisfy the total amount of $Na_2O+K_2O$); and is sufficient in moisture absorption resistance (satisfy the soluble $Na_2O$ amount).

In Table 2, comparative Example No. 12, in which the soluble $Na_2O$ amount is set at 0.88 wt % in the YF309C (AWS: E09T-1) slag composition system, is excellent in arc stability; but is insufficient in moisture absorption resistance. Comparative Example No. 13, in which the soluble $Na_2O$ amount is set at 0.01 wt % and the soluble $K_2O$ amount is set at 0.60 wt % in the YF309C (AWS: E09T-1) slag composition system, is poor in arc stability (the total amount of $Na_2O+K_2O$: under the allowable range); and is excellent in moisture absorption resistance.

Inventive Example No. 14, in which the soluble $Na_2O$ amount in Comparative Example No. 13 is set at 0.30 wt %, is excellent in arc stability (satisfy the total amount of $Na_2O+K_2O$); and is sufficient in moisture absorption resistance. Inventive Example No. 15, in which the slag base in Inventive Example No. 14 is shifted to the $TiO_2$ system, is excellent in arc stability (satisfy the total amount of $Na_2O+K_2O$); and is sufficient in moisture absorption resistance. Inventive Example No. 16, in which the total $Na_2O$ amount is approximately equal to that of Conventional Example No. 12 but the soluble $Na_2O$ amount is set at 0.32 wt %, is excellent in arc stability (satisfy the total amount of $Na_2O+K_2O$); and is sufficient in moisture absorption resistance. Inventive Example No. 17, in which the soluble $Na_2O$ amount in Inventive Example No. 14 is set at 0.45 wt %, is excellent in arc stability (satisfy the total amount of $Na_2O+K_2O$); and is sufficient in moisture absorption resistance.

Comparative Example No. 18, in which the soluble $K_2O$ amount in Inventive Example No. 16 is set at 1.00 wt %, is excellent in arc stability; but is insufficient in moisture absorption resistance. Comparative Example No. 19, which satisfies the formula (1) but contains $Na_2O$ in an amount more than 1.5%, is poor in moisture absorption resistance. Comparative Example No. 20, which satisfies the formula (1) but contains $K_2O$ in an amount more than 0.8%, is poor in moisture absorption resistance.

In Table 3, Nos. 21 to 31 are examples in which a Li compound and/or Cs compound are added in flux. Inventive Examples Nos. 21 to 25, No. 28, No. 31 and No. 33 are excellent in arc stability and in moisture absorption resistance.

Comparative Example No. 27, which almost satisfies requirements but contains $(Cs_2O+Li_2O)$ in an excessively larger amount, has a tendency of increasing the spatter amount, and accordingly is insufficient as the total evaluation. Comparative Example No. 26 is the same as Conventional Example No. 1

Comparative Example No. 29, in which the soluble $Na_2O$ amount is larger, is poor in moisture absorption resistance. Comparative Example No. 30, which does not satisfy the formula (1), is insufficient in moisture absorption resistance. Comparative Example No. 32 is poor in arc stability (not satisfy the total amount of the soluble $Na_2O$ and $K_2O$).

As described above, the flux-cored wire of the present invention makes it possible to improve the excellent arc stability and the moisture absorption resistance of fume/slag, and hence to ensure the excellent resistance to pit formation.

TABLE 1

| No. | Soluble Alkali in Flux (%) $Na_2O$ | Soluble Alkali in Flux (%) $K_2O$ | Total Alkali in Flux (%) $Na_2O$ | Total Alkali in Flux (%) $K_2O$ | Slag Former in Flux (wt %) $SiO_2$ | Slag Former in Flux (wt %) $TiO_2$ | Slag Former in Flux (wt %) $ZrO_2$ | Slag Former in Flux (wt %) $Al_2O_3$ | The Value of Formula (1) ($\times 10^{-3}$) | The Value of Formula (2) ($\times 10^{-3}$) | Arc Stability | Moisture Absorption Resistance | Resistance to Pit Formation | Total Evaluation | Remarks |
| --- | --- | --- | --- | --- | --- | --- | --- | --- | --- | --- | --- | --- | --- | --- | --- |
| 1 | 2.40 | 0.01 | 6.3 | 0.01 | 6.0 | 12.1 | 5.6 | 19.6 | 97.3 | — | ○*1 | X | X | X*1 | Conventional Example |
| 2 | 2.30 | 0.01 | 6.1 | 0.01 | 12.1 | 5.9 | 5.5 | 19.4 | 83.6 | — | ○ | X | X | X | Comparative Example |
| 3 | 2.40 | 0.01 | 6.4 | 0.01 | 22.9 | 3.3 | 2.3 | 10.0 | 78.2 | — | ○ | △ | △ | △ | Comparative Example |
| 4 | 1.20 | 0.01 | 3.5 | 0.01 | 23.0 | 3.5 | 2.2 | 10.5 | 38.6 | — | ○ | ○ | ○ | ○ | Inventive Example |
| 5 | 0.60 | 0.01 | 1.5 | 0.01 | 22.8 | 3.5 | 2.4 | 10.3 | 19.4 | — | ○ | ⊙ | ⊙ | ○ | Inventive Example |
| 6 | 0.30 | 0.01 | 0.8 | 0.01 | 22.8 | 3.4 | 2.4 | 9.8 | 9.8 | — | △ | ⊙ | ⊙ | △ | Comparative Example |
| 7 | 0.30 | 0.01 | 1.9 | 0.01 | 22.7 | 3.6 | 2.3 | 9.9 | 9.8 | — | ○ | ⊙ | ⊙ | ⊙ | Inventive Example |
| 8 | 0.60 | 0.60 | 1.4 | 1.30 | 23.0 | 3.4 | 2.2 | 10.1 | 21.4 | — | ○ | ⊙ | ⊙ | ⊙ | Inventive Example |
| 9 | 0.60 | 0.40 | 1.3 | 0.80 | 23.0 | 3.3 | 2.1 | 10.5 | 20.7 | — | ○ | ⊙ | ⊙ | ⊙ | Inventive Example |
| 10 | 0.30 | 0.90 | 2.0 | 1.70 | 22.6 | 3.5 | 2.2 | 10.0 | 12.8 | — | ○ | △ | △ | △ | Comparative Example |
| 11 | 0.60 | 0.10 | 1.3 | 0.20 | 23.0 | 3.3 | 2.1 | 10.6 | 21.4 | — | ○ | ⊙ | ⊙ | ⊙ | Inventive Example |

*1 Spatter and fume amount are largely generated because $Na_2O + K_2O > 6$.

TABLE 2

| No. | Soluble Alkali in Flux (%) $Na_2O$ | Soluble Alkali in Flux (%) $K_2O$ | Total Alkali in Flux (%) $Na_2O$ | Total Alkali in Flux (%) $K_2O$ | Slag Former in Flux (wt %) $SiO_2$ | Slag Former in Flux (wt %) $TiO_2$ | Slag Former in Flux (wt %) $ZrO_2$ | Slag Former in Flux (wt %) $Al_2O_3$ | The Value of Formula (1) ($\times 10^{-3}$) | The Value of Formula (2) ($\times 10^{-3}$) | Arc Stability | Moisture Absorption Resistance | Resistance to Pit Formation | Total Evaluation | Remarks |
| --- | --- | --- | --- | --- | --- | --- | --- | --- | --- | --- | --- | --- | --- | --- | --- |
| 12 | 0.88 | 0.01 | 1.60 | 0.64 | 13.2 | 5.5 | 7.6 | 2.3 | 42.1 | — | ○ | △ | △ | △ | Comparative Example |
| 13 | 0.01 | 0.60 | 0.02 | 1.10 | 13.0 | 5.6 | 7.3 | 2.5 | 3.4 | — | △ | ⊙ | ⊙ | △ | Comparative Example |
| 14 | 0.30 | 0.60 | 0.60 | 1.00 | 12.9 | 5.5 | 7.4 | 2.5 | 17.4 | — | ○ | ⊙ | ⊙ | ○ | Inventive Example |
| 15 | 0.35 | 0.60 | 0.68 | 0.90 | 5.9 | 10.5 | 7.5 | 2.3 | 27.0 | — | ○ | ○ | ○ | ○ | Inventive Example |
| 16 | 0.32 | 0.02 | 1.48 | 0.64 | 13.1 | 5.5 | 7.7 | 2.3 | 15.4 | — | ○ | ⊙ | ⊙ | ⊙ | Inventive Example |
| 17 | 0.45 | 0.59 | 0.71 | 1.05 | 12.6 | 5.5 | 7.5 | 2.3 | 25.1 | — | ○ | ○ | ○ | ○ | Inventive Example |
| 18 | 0.35 | 1.00 | 0.60 | 1.70 | 12.5 | 5.6 | 7.6 | 2.4 | 41.9 | — | ○ | △ | △ | △ | Comparative Example |
| 19 | 1.80 | 0.01 | 3.40 | 0.02 | 28.0 | 13.1 | 5.6 | 20.3 | 37.9 | — | ○ | △ | △ | △ | Compar- |

TABLE 2-continued

| No. | Soluble Alkali in Flux (%) Na₂O | Soluble Alkali in Flux (%) K₂O | Total Alkali in Flux (%) Na₂O | Total Alkali in Flux (%) K₂O | Slag Former in Flux (wt %) SiO₂ | Slag Former in Flux (wt %) TiO₂ | Slag Former in Flux (wt %) ZrO₂ | Slag Former in Flux (wt %) Al₂O₃ | The Value of Formula (1) (×10⁻³) | The Value of Formula (2) (×10⁻³) | Arc Stability | Moisture Absorption Resistance | Resistance to Pit Formation | Total Evaluation | Remarks |
|---|---|---|---|---|---|---|---|---|---|---|---|---|---|---|---|
| 20 | 0.50 | 1.21 | 1.10 | 2.11 | 10.3 | 3.4 | 7.3 | 7.6 | 32.8 | — | ○ | Δ | Δ | Δ | ative Example Comparative Example |

TABLE 3

| No. | Soluble Alkali in Flux (%) Na₂O | Soluble Alkali in Flux (%) K₂O | Total Alkali in Flux (%) Na₂O | Total Alkali in Flux (%) K₂O | Total Alkali in Flux (%) Li₂O | Total Alkali in Flux (%) Cs₂O | Slag Former in Flux (wt %) SiO₂ | Slag Former in Flux (wt %) TiO₂ | Slag Former in Flux (wt %) ZrO₂ | Slag Former in Flux (wt %) Al₂O₃ | The Value of Formula (1) (×10⁻³) |
|---|---|---|---|---|---|---|---|---|---|---|---|
| 21 | 1.20 | 0.02 | 3.50 | 0.03 | 0.33 | 0.32 | 23.0 | 3.3 | 7.6 | 5.3 | — |
| 22 | 0.51 | 0.40 | 0.95 | 0.82 | 0.31 | 0.54 | 21.9 | 5.6 | 7.3 | 6.4 | — |
| 23 | 0.59 | 0.31 | 1.15 | 0.55 | 0.09 | 0.22 | 13.7 | 5.4 | 7.6 | 12.4 | — |
| 24 | 0.92 | 0.18 | 1.91 | 0.40 | 0.30 | 0.88 | 8.3 | 10.5 | 2.3 | 4.7 | — |
| 25 | 0.30 | 1.00 | 0.58 | 1.93 | 1.10 | 0.11 | 23.4 | 12.0 | 2.1 | 1.0 | — |
| 26 | 2.40 | 0.01 | 6.30 | 0.01 | 0.01 | 0.01 | 6.0 | 3.5 | 7.6 | 25.2 | — |
| 27 | 0.60 | 0.45 | 1.10 | 0.93 | 2.51 | 2.79 | 10.3 | 5.5 | 5.6 | 10.4 | — |
| 28 | 1.33 | 1.21 | 2.61 | 2.11 | 2.50 | 0.01 | 10.3 | 7.3 | 7.6 | — |
| 29 | 2.18 | 0.88 | 6.20 | 1.71 | 0.15 | 0.13 | 5.7 | 10.5 | 2.3 | 3.0 | — |
| 30 | 0.60 | 0.35 | 1.10 | 0.77 | 0.35 | 0.01 | 6.3 | 5.6 | 7.6 | 21.8 | — |
| 31 | 0.60 | 0.12 | 1.21 | 0.26 | 0.30 | — | 12.5 | 3.5 | 7.8 | 2.0 | — |
| 32 | 0.01 | 0.005 | 0.01 | 0.01 | 0.40 | 0.01 | 12.6 | 3.4 | 2.4 | 17.0 | — |
| 33 | 0.59 | 0.12 | 1.30 | 0.25 | — | 0.28 | 12.8 | 5.8 | 3.5 | 4.2 | — |

| No. | The Value of Formula (2) (×10⁻³) | Arc Stability | Moisture Absorption Resistance | Resistance to Pit Formation | Total Evaluation | Remarks |
|---|---|---|---|---|---|---|
| 21 | 18.3 | ○ | ○ | ○ | ○ | Inventive Example |
| 22 | −9.5 | ○ | ⊙ | ⊙ | ○ | Inventive Example |
| 23 | 11.8 | ○ | ○ | ○ | ○ | Inventive Example |
| 24 | −14.2 | ○ | ○ | ○ | ○ | Inventive Example |
| 25 | −26.2 | ○ | ○ | ○ | ○ | Inventive Example |
| 26 | 98.6 | ○ | X | X | X | Comparative Example |
| 27 | −221.1 | ○ | ○ | ○ | Δ*² | Comparative Example |
| 28 | −54.4 | ○ | ○ | ○ | ○ | Inventive Example |
| 29 | 146.2 | ○*³ | X | X | X | Comparative Example |
| 30 | 20.5 | ○ | Δ | Δ | Δ | Comparative Example |
| 31 | −16.3 | ○ | ○ | ○ | ○ | Inventive Example |
| 32 | −16.6 | X | Δ | Δ | X | Comparative Example |
| 33 | 16.5 | ○ | ○ | ○ | ○ | Inventive Example |

*²Spatter is largely generated because Cs₂O + Li₂O > 3, and the total evaluation becomes Δ.
*³Spatter and fume amount are largely generated because Na₂O + K₂O > 6.

We claim:

1. A flux-cored wire for low alloy steels and high alloy steels, comprising:
   a metal sheath; and
   a flux which fills the metal sheath, said flux constituted of Na compounds, which include a soluble Na compound, K compounds, which include a soluble K compound, SiO₂, and at least one oxide selected from the group consisting of TiO₂, ZrO₂ and Al₂O₃, wherein:
   (A) the total weight % of the Na compound (Na₂O equivalent amount) + the K compound (K₂O equivalent amount) components of the flux ranges from 1.5–6.0%; and
   (B) the weight percentages of components of the flux are as follows:
      i) the soluble Na compound (Na₂O equivalent amount) is 1.5 or less,
      ii) the soluble K compound (K₂O equivalent amount) is 0.8% or less,
      iii) the SiO₂ content is 5–30%,
      iv) the TiO₂+ZrO₂+Al₂O₃ content is 5–40%;
   the flux ratio (wire weight %) of the wire being equal to 10–30%; and wherein the contents of the soluble Na compound, the soluble K compound, $SiO_2$, $TiO_2$, $ZrO_2$ and $Al_2O_3$ satisfy the following relationship (1):

{soluble Na compound ($Na_2O$ equivalent amount)+0.1×the soluble K compound $K_2O$ equivalent amount)}/{$SiO_2$+0.5×($TiO_2$+$ZrO_2$+$Al_2O_3$)} is $40 \times 10^{-3}$ or less . . . (1).

2. A flux-cored wire for low alloy steels and high alloy steels, comprising:
a metal sheath; and
a flux which fills the metal sheath, said flux constituted of Na compounds, which include a soluble Na compound, K compounds, which include a soluble K compound, at least one compound selected from the group consisting of Li compound and a Cs compound, $SiO_2$, and at least one oxide selected from the group consisting of $TiO_2$, $ZrO_2$ and $Al_2O_3$, wherein
(A) the total weight % of Na compounds ($Na_2O$ equivalent amount)+K compounds ($K_2O$ equivalent amount) components of the flux equal 1.5–6.0%; and
(B) the weight percentages of components of the flux are as follows:
  i) the soluble Na compound ($Na_2O$ equivalent amount) is 1.5 or less,
  ii) the soluble K compound ($K_2O$ equivalent amount) is 0.8% or less,
  iii) the total of said at least one Li compound ($Li_2O$ equivalent amount)+Cs compound ($Cs_2O$ equivalent amount) is 0.1–3.0%,
  iv) the $SiO_2$ amount is 5–30%, and
  v) the $TiO_2$+$ZrO_2$+$Al_2O_3$ amount is 5–40%;
the flux ratio (wire weight %) of the wire being equal to 10–30%; and
wherein the contents of said soluble Na compound, said soluble K compound, said Li compound, said Cs compound, $SiO_2$, $TiO_2$, $ZrO_2$ and $Al_2O_3$ satisfy the following relationship (2):
{soluble Na compound ($Na_2O$ equivalent amount)+0.1×soluble K compound ($K_2O$ equivalent amount)-the Li compound ($Li_2O$ equivalent amount)-Cs compound ($Cs_2O$ equivalent amount)}/{$SiO_2$+0.5×($TiO_2$+$ZrO_2$+$Al_2O_3$)} is $20 \times 10^{-3}$ or less . . . (2).

3. The flux-cored wire of claim 2, wherein said Li compound and said Cs compound, as components of the flux are within the following ranges:
Li compound ($Li_2O$ equivalent amount) (flux weight %) is 0.01–2%, and
Cs compound ($Cs_2O$ equivalent amount) (flux weight %) is 0.01–2.0%.

* * * * *